(12) United States Patent
Bennett

(10) Patent No.: US 8,332,597 B1
(45) Date of Patent: Dec. 11, 2012

(54) SYNCHRONIZATION OF EXTERNAL MEMORY ACCESSES IN A DATAFLOW MACHINE

(75) Inventor: David W. Bennett, Silverthorne, CO (US)

(73) Assignee: Xilinx, Inc., San Jose, CA (US)

( * ) Notice: Subject to any disclaimer, the term of this patent is extended or adjusted under 35 U.S.C. 154(b) by 454 days.

(21) Appl. No.: 12/539,520

(22) Filed: Aug. 11, 2009

(51) Int. Cl.
*G06F 12/00* (2006.01)
(52) U.S. Cl. ............... 711/154; 711/167; 711/E12.001
(58) Field of Classification Search .................. None
See application file for complete search history.

(56) References Cited

U.S. PATENT DOCUMENTS

| | | | | |
|---|---|---|---|---|
| 5,226,131 | A * | 7/1993 | Grafe et al. | 712/201 |
| 5,918,242 | A * | 6/1999 | Sarma et al. | 711/105 |
| 7,315,991 | B1 | 1/2008 | Bennett | |
| 7,490,218 | B2 | 2/2009 | Eggers et al. | |
| 2007/0266223 | A1* | 11/2007 | Nguyen | 712/10 |
| 2008/0005357 | A1* | 1/2008 | Malkhi et al. | 709/248 |

OTHER PUBLICATIONS

Dennis, Jack B. et al., "An Efficient Pipeline Dataflow Processor Architecture," *Proc. of the 1988 ACM/IEEE Conference on Supercomputing*, Nov. 14-18, 1988, pp. 368-373, Orlando, Florida, USA.
Putnam, Andrew et al., "CHIMPS: A C-Level Compilation Flow for Hybrid CPU-FPGA Architectures," *Proc. of the 16th International ACM/SIGDA Symposium on Field Programmable Gate Arrays*, Feb. 24-26, 2008, pp. 261-269, Monterey, California, USA.
Swanson, Steve et al., "WaveScalar," *Proc. of the 36th International Symposium on Microarchitecture*, Dec. 3-5, 2003, pp. 1-12, San Diego, California.
Wikipedia, "Dataflow architecture," *Wikipedia*, last modified Aug. 27, 2007, downloaded Mar. 26, 2008 , pp. 1-2, <http://en.wikipedia.org/wiki/Dataflow_architecture>.
U.S. Appl. No. 12/791,256, filed Jun. 1, 2010, Bennett et al.

\* cited by examiner

*Primary Examiner* — Jasmine Song
*Assistant Examiner* — Daniel Bernard
(74) *Attorney, Agent, or Firm* — LeRoy D. Maunu

(57) ABSTRACT

Approaches for synchronizing memory accesses in a dataflow computing system. A compute operation in the dataflow computing system is commenced in response to availability in a dataflow memory of each operand that is required to perform the compute operation. Output data from a compute operation is stored in the dataflow memory at completion of the compute operation. Write and read operations are supported for accessing an external memory. Accesses to the external memory are synchronized by storing synchronization tokens in the data flow memory. Each synchronization token signals when an address in the external memory may be accessed.

17 Claims, 5 Drawing Sheets

SYNCHRONIZATION OF EXTERNAL MEMORY ACCESSES IN A DATAFLOW MACHINE

FIELD OF THE INVENTION

The present invention generally relates to dataflow machines and synchronizing accesses to both the dataflow memory and to an additional memory.

BACKGROUND

A major difference between a dataflow architecture and a von Neumann architecture is that a data flow architecture does not use a program counter to select instructions for execution as does a von Neumann architecture. The dataflow architecture uses dependencies defined by the dataflow graph of a program to determine those instructions that can be executed based on the availability of the data that each instruction requires for execution. When the data required by an instruction is available, the instruction is "fired."

A data flow machine typically uses a dataflow memory to store data as it is processed. The dataflow memory may include first-in-first-out (FIFO) buffers between pipeline stages of a dataflow architecture. Alternatively, a token memory may be monitored by a scheduler which fires instructions when operands are tagged as being available in the token memory.

For some applications of a dataflow architecture, it may be desirable to access a memory that is external to the dataflow memory. For a dataflow architecture having FIFO buffers between pipeline stages the external memory is in addition to the FIFO buffers, and for a dataflow architecture having a token memory that is monitored by a scheduler the memory is in addition to the token memory. The external memory may be used for inputting data to the dataflow or outputting data from the data flow. However, in order to produce semantically correct results in executing a program on a dataflow machine, accesses to the external memory must be synchronized.

The present invention may address one or more of the above issues.

SUMMARY

The various embodiments of the invention provide approaches for synchronizing memory accesses in a dataflow computing system. In one embodiment, a method includes commencing a compute operation in the dataflow computing system in response to availability in a dataflow memory of each operand that is required to perform the compute operation. Output data from the compute operation are stored in the dataflow memory at completion of the compute operation. For each write operation for storing data at a respective write address in an external memory of the system, in response to input from the dataflow memory of a synchronization token associated with the respective write address, the respective write address, and the data, the data are stored to the respective write address in the external memory and a synchronization token associated with the write address is stored in the dataflow memory after the writing of the data. For each read operation for reading data from a respective read address in the external memory, in response to input from the dataflow memory of the respective read address and a synchronization token associated with the respective read address, data are read from the respective read address of the external memory, the data read from the external memory are stored in the dataflow memory, and a synchronization token associated with the respective read address is stored in the dataflow memory after reading the data.

In another embodiment, a computing system having a dataflow architecture is provided. The computing system includes a random access memory (RAM); a plurality of write-type functional units coupled to the RAM; a plurality of read-type functional units coupled to the RAM; a plurality of compute-type functional units; and a plurality of respective sets of first-in-first-out buffers coupled between pairs of read-type, write-type, and compute-type functional units. Each write-type functional unit is configured to store data to a write address in the RAM in response to input of the write address, the data, and a synchronization token from one of the respective sets of FIFO buffers, and store a synchronization token in a FIFO buffer of one of the respective sets of FIFO buffers after storing of the data in the RAM. Each read-type functional unit is configured to read data from the RAM at a read address in response to input of the read address and a synchronization token from one of the respective sets of FIFO buffers, and store the data read from the RAM and a synchronization token in one of the respective sets of FIFO buffers after reading the data. Each compute-type functional unit is configured to process data input from one of the respective sets of FIFO buffers and store processed data in one of the respective sets of FIFO buffers.

Another embodiment of a dataflow computing system includes a random access memory (RAM); a plurality of functional units coupled to the RAM; a token memory; and a scheduler coupled to the token memory and to the plurality of functional units. For each write operation for writing data to a respective write address of the RAM, the scheduler activates one of the functional units in response to a synchronization token associated with the respective write address in the token memory, and the one functional unit stores the data to the respective write address in the RAM and stores a respective synchronization token associated with the respective write address in the token memory after the writing of the data. For each read operation for reading data from a respective read address of the RAM, the scheduler activates one of the functional units in response to availability in the token memory of a synchronization token associated with the respective read address, and the one functional unit reads data from the respective read address of the RAM, stores the data read from the memory in the token memory, and stores a respective synchronization token in the token memory after reading the data. For each compute operation for processing one or more operands, the scheduler activates one of the functional units to process the one or more operands in response to availability of the one or more operands in the token memory, and the one of the functional units stores data to the token memory.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

The various embodiments of the invention provide synchronization of accesses to a random access memory (RAM) that is supplemental to the dataflow memory of the dataflow machine. "Dataflow memory" and "RAM" are used to refer to the two different purposes for which memory is used in the embodiments of the invention. The dataflow memory refers to that memory used in a dataflow machine to pass data between dataflow operations. The dataflow memory stores data to be passed between the operations of the dataflow machine as represented by the arcs in a dataflow graph. The RAM refers to supplemental memory that may be accessible to components external to the dataflow machine. Data from the RAM may be injected into the dataflow, and data may be ejected from the dataflow and stored in the RAM for external access.

Two instructions are implemented for accessing the RAM. In this disclosure, the instructions are named memread and memwrite. In processing a memread instruction, data are read from the external memory and introduced into the dataflow memory for processing. In processing a memwrite instruction, data are extracted from the dataflow memory and stored in the external memory. The memread and memwrite instructions should not be confused with the reading from and writing to the dataflow memory, which occurs in executing instructions other than the memread and memwrite.

Synchronization tokens are used to signal completion of memread and memwrite instructions so that the intended ordering of accesses to the RAM, as specified in program source code, is honored in executing the instructions. Each memread and memwrite instruction outputs a synchronization token, which is associated with the address read from or written to, to signal completion of the operation on that address. Processing of a memread instruction proceeds once both an address and the synchronization token for that address are available. Processing of a memwrite instruction proceeds once the data to be written, an address, and the synchronization token for that address are available.

Figure 1:
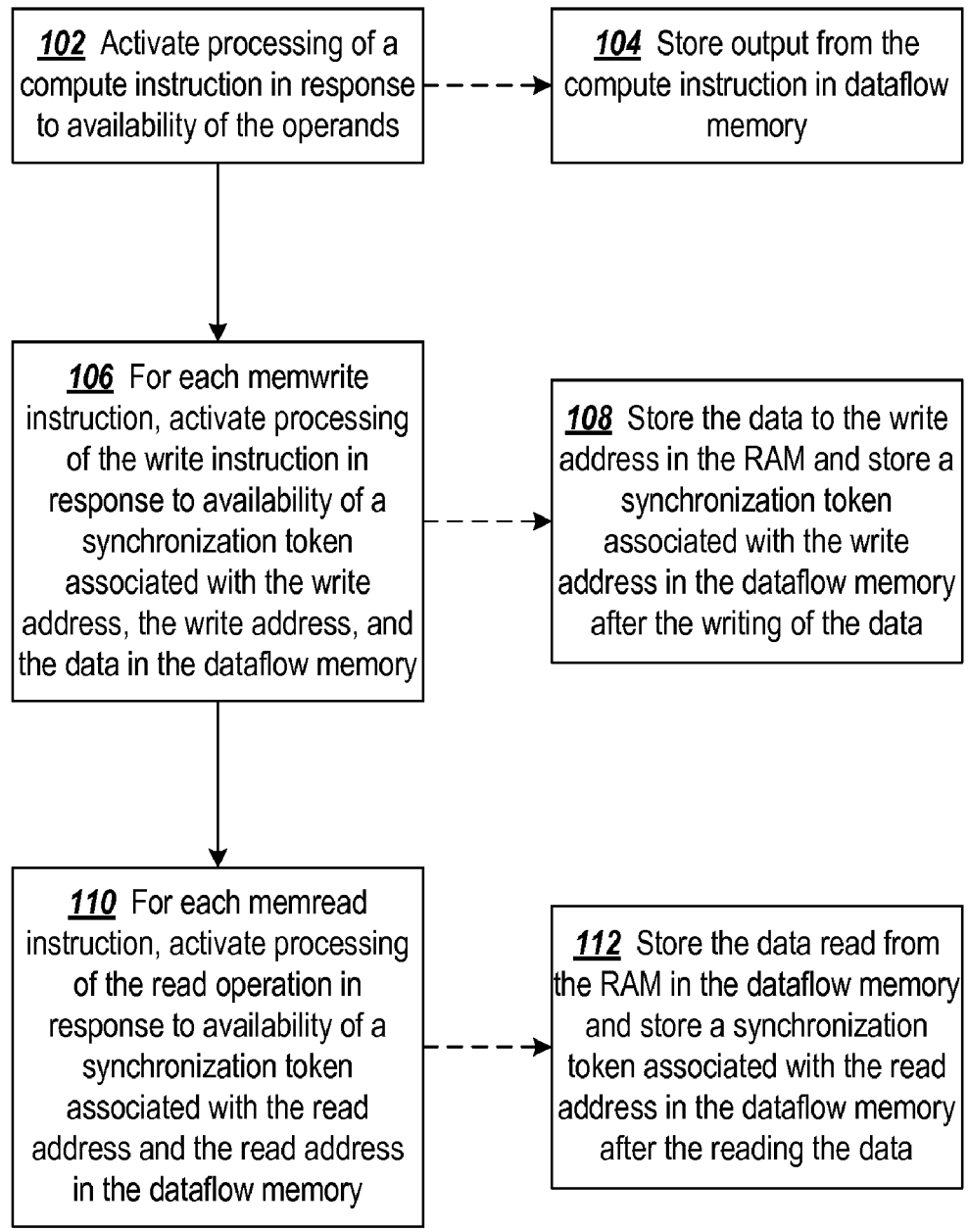
FIG. 1 is a flowchart of an example process for synchronizing accesses to a RAM in a dataflow machine.

FIG. 1 is a flowchart of an example process for synchronizing accesses to a RAM in a dataflow machine. For purposes of illustration, the flowchart shows the processing of both compute instructions as well as the memread and memwrite instructions for accessing the RAM. The general process may be performed in either static or dynamic dataflow architectures.

At step 102, a compute instruction is activated in response to availability of the operands in the dataflow memory. A compute instruction may be any instruction other than the memread and memwrite instructions. For example, a compute instruction may add, subtract, multiply, or divide two operands or perform a logic function on a single operand. The operands for the compute instructions are maintained in the dataflow memory.

In a pipelined dataflow machine in which instructions are implemented as hardware blocks in stages of the pipeline, the dataflow memory includes FIFO buffers that store data as the data moves from one stage to the next. Thus, a compute instruction is activated once the required data is present in the FIFO buffer that provides input data to the compute instruction. In a dataflow machine having a token memory, a scheduler determines the availability of the required operand(s) and dispatches the compute instruction for processing by a functional unit when the required operand(s) are available. Output from the compute instruction is stored in the dataflow memory as shown by step 104. As those skilled in the art will recognize, the output may be stored in a FIFO buffer for a pipelined dataflow machine or stored in a token memory for a dynamic dataflow machine.

The dataflow processing of the memwrite and memread instructions is dependent not only on the availability of the required addresses and data, but also on the availability of synchronization tokens. As shown in step 106, for each memwrite instruction the processing of the instruction is activated once the address, data, and synchronization token for that address are available. In processing a memwrite instruction, the data are written to the RAM and a synchronization token is stored in the dataflow memory in association with the RAM address to which the data was written, as shown by step 108.

For each memread instruction, the processing of the instruction is activated once the address and synchronization token for that address are available, as shown by step 110. At step 112, the processing of a memread instruction stores the data that were read from the RAM in the dataflow memory, along with a synchronization token that is associated with the RAM address from which the data were read.

The memwrite and memread instructions allow access to data in a memory that is supplemental to the dataflow memory, while maintaining synchronization of accesses to conform to the expected sequence of accesses as provided in a source program from which the compute and memwrite and memread instructions were generated. U.S. Pat. No. 7,315,991 describes methods for compiling a program in a high-level language into a massively parallel pipelined system. The resulting system is a dataflow machine in which instructions are implemented as hardware blocks, and FIFO buffers provide the dataflow memory between the hardware blocks. U.S. Pat. No. 7,315,991, which is incorporated herein by reference, may be referenced for further description of the example parallel pipelined dataflows used in this description and the generating of a parallel pipelined dataflow machine from high-level source code.

The availability of data in the FIFO buffers provides synchronization control between two compute stages of a pipeline. However, the FIFO buffers do not provide sufficient synchronization control when the access is required to RAM instead of the FIFO buffers. The following example illustrates the synchronization problem stemming from a particular example of a high-level language code fragment which has been compiled into a pipelined dataflow machine. The code fragment is set forth in Example 1.

```
. . .
char* addr;
. . .
*addr=x;
int a=*addr*y;
*addr=a
. . .
```

Example 1

In the code of Example 1, the value of addr is stored at the location s. The value of x is then stored at the location referenced by the value of s (the value of x is stored in the location addr). The product of the value at the location stored in s and the value of y is stored in location of a. The expected result of the code is that location a will have the value of x*y, and addr will have the value of a.

In a typical dataflow paradigm, as soon as the inputs are available the operations would begin. However, if multiple instructions are supposed to access the same RAM location, the execution order may not be consistent with that intended as specified in the high-level language code. In the code fragment of Example 1, addr is assumed to be a location in RAM. In a dataflow of the code fragment the execution order of the statements may be different from the order in which the statements appear in the high-level language code, and the machine execution order may not be what the programmer intended. In order to maintain semantic correctness of the program code in the dataflow implementation, the accesses to addr need to be synchronized.

Figure 2:
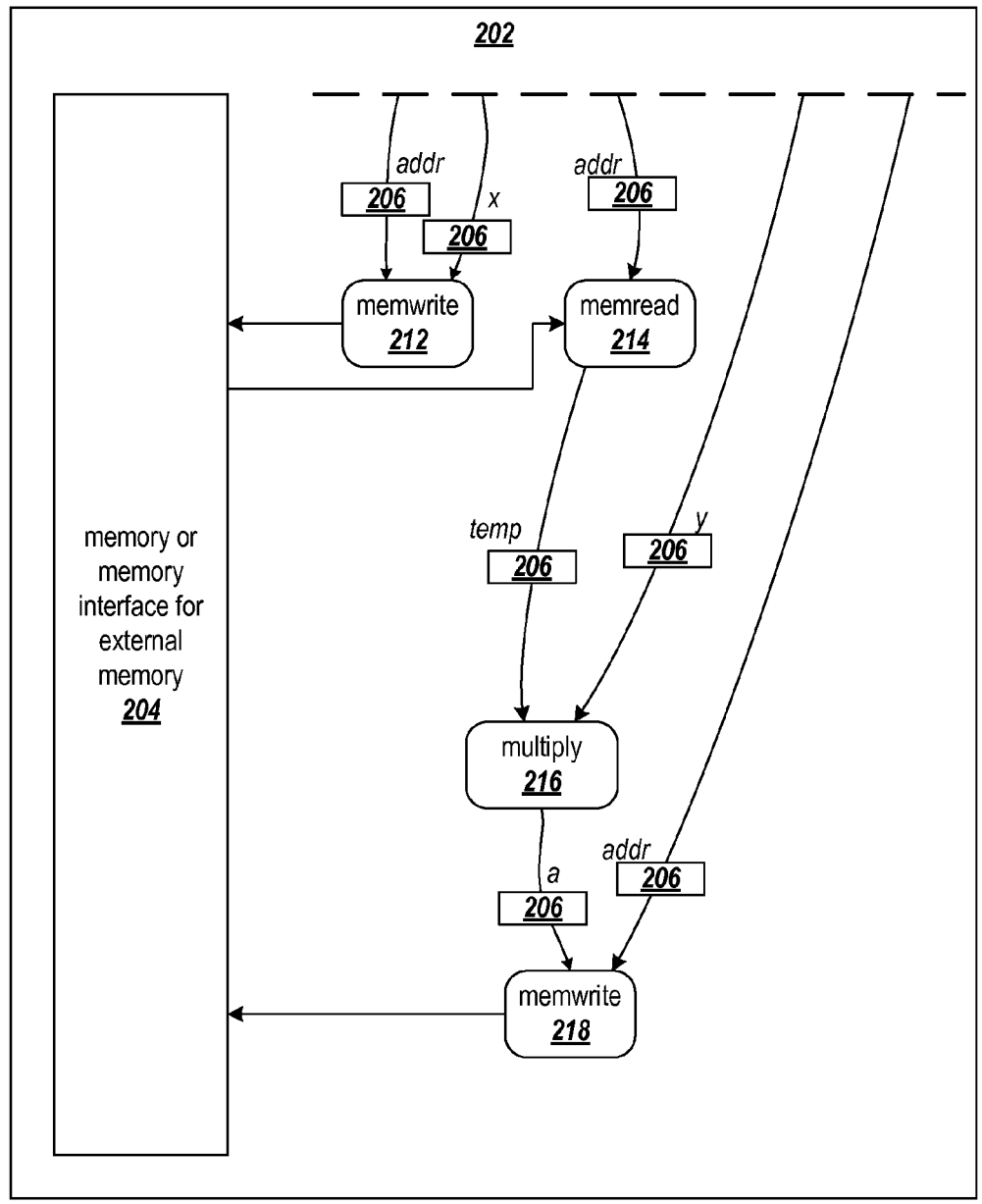
FIG. 2 is a functional block diagram of a pipelined dataflow machine implemented from an example code fragment.

FIG. 2 is a functional block diagram of a pipelined dataflow machine 202 implemented from the code fragment of Example 1. In an example embodiment, the dataflow machine may be implemented in a programmable logic device. Depending on design objectives, the dataflow machine may also be an application specific integrated circuit (ASIC).

The example dataflow machine includes both dataflow memory and supplemental or external RAM 204. The RAM may be on the same device as the circuitry that implements the dataflow operations. Alternatively, the device may include an interface for accessing an external RAM. The dataflow memory includes the FIFO buffers, which are collectively labeled as elements 206.

The memwrite block 212 corresponds to and implements the source code statement *s=x, and the memread block 214 corresponds to and implements the portion of the statement, int a=*s*y which obtains the value from *s (which is the value of addr) for input to the multiply block 216. The memwrite block corresponds to the statement *s=a.

Without synchronization, the accesses to addr by both the memwrite block 212 and memread block 214 may not occur in the intended order set forth in the code fragment. The memwrite and memread operations are performed as soon as the respective inputs are available. Thus, if the input (addr) to the memread arrives sooner than either of the inputs to the memwrite, the memread would be performed before the memwrite. If the memread were performed before the memwrite, the value x would not yet have been stored in addr, and the multiply block 216 would input unknown data as the temp input.

To remedy the potential for errors, the embodiments of the present invention provide synchronization tokens between the processing of memread and memwrite instructions. A memread instruction is not executed until both the input address and associated synchronization token are available. Each memread instruction outputs a synchronization token associated with the address once the read is complete. A memwrite instruction is not executed until all of the input address, data, and synchronization token associated with the address are available. Each memwrite instruction outputs a synchronization token associated with the address when the write is complete.

Figure 3:
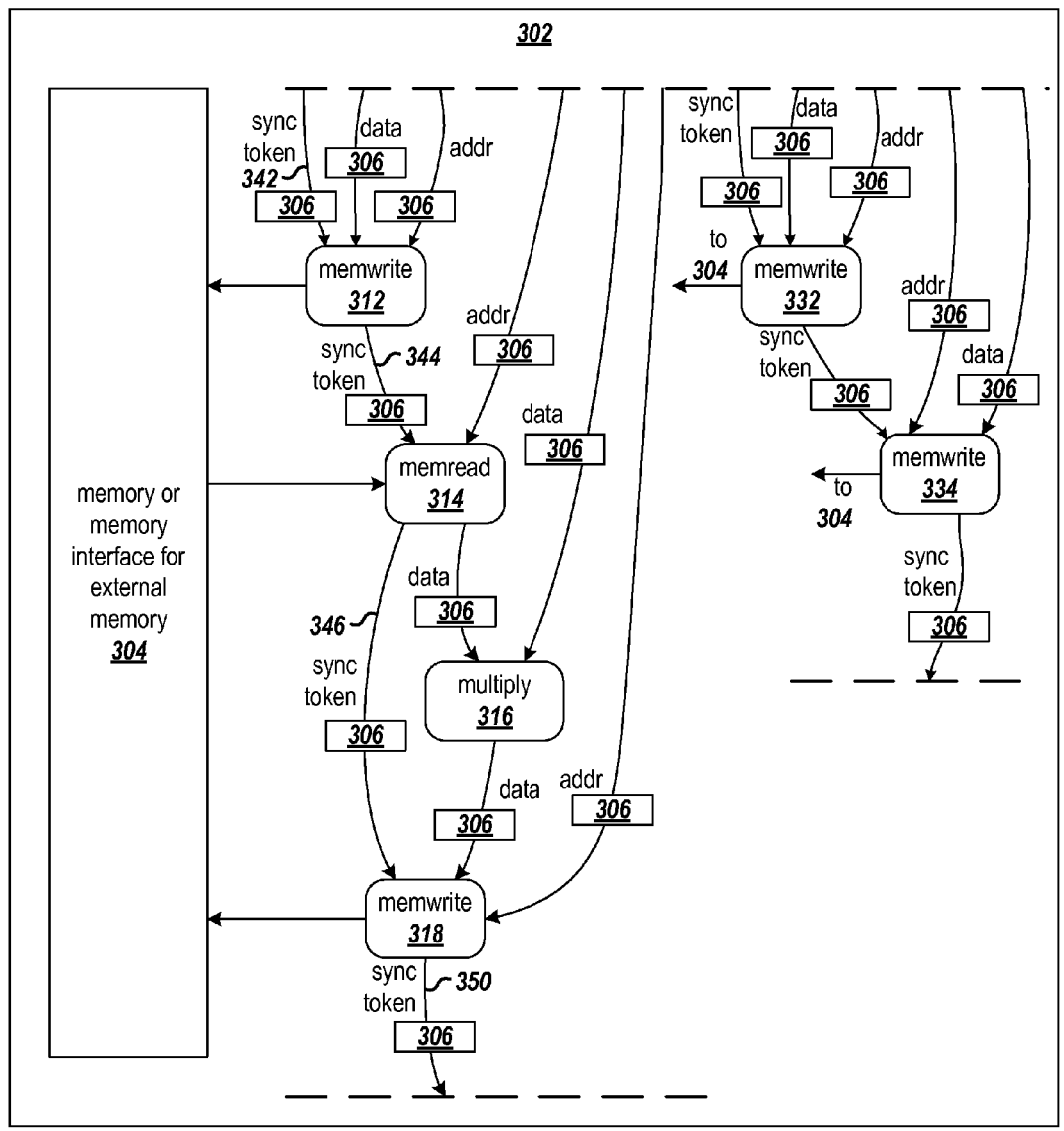
FIG. 3 shows an example pipelined dataflow machine in which synchronization tokens are employed between mem-read and memwrite blocks.

FIG. 3 shows an example pipelined dataflow machine 302 in which synchronization tokens are employed between memread and memwrite blocks. As with the example in FIG. 2, the dataflow machine 302 may be implemented in a programmable logic device or an ASIC, depending on design objectives. The RAM may be on the same device as the circuitry that implements the dataflow operations, or the device may include an interface for accessing an external RAM.

The example shows two legs of an example dataflow machine. One leg corresponds to the example dataflow machine of FIG. 2, with synchronization tokens added for controlling access to the RAM 304. The other leg shows that a memwrite block 332 followed by another memwrite block 334 also use a synchronization token.

The memwrite block 312, memread block 314, multiply block 316, and memwrite block 318 correspond to blocks 212, 214, 216, and 218 of FIG. 2, respectively, and further to the high-level program statements of Example 1 as explained above. The FIFO buffers in the dataflow machine 302 are collectively labeled as elements 306. Each of the memwrite and memread blocks inputs a synchronization token, which must be present for the respective operation to be performed. Memwrite block 312 waits for synchronization token 342 in addition to waiting for the address and data before writing the data to the RAM 304.

Each of the memread and memwrite blocks also outputs a synchronization token upon completing the operation. Memwrite block 312 outputs synchronization token 344, which is input to memread block 314. Memread block 314 waits for availability of both the synchronization token 344 and the address before reading from the RAM 304. The memread block outputs a synchronization token 346, which is input to the memwrite block 318. The memwrite block 318 outputs synchronization token 350 to the next memwrite or memread instruction that accesses the same RAM address as memwrite block 318.

The invention is also useful in other dataflow machine architectures. For example, another embodiment of the invention employs the synchronization tokens in a dataflow machine that operates with a token memory with multiple functional units executing instructions and accessing operands in the token memory.

Figure 4A:
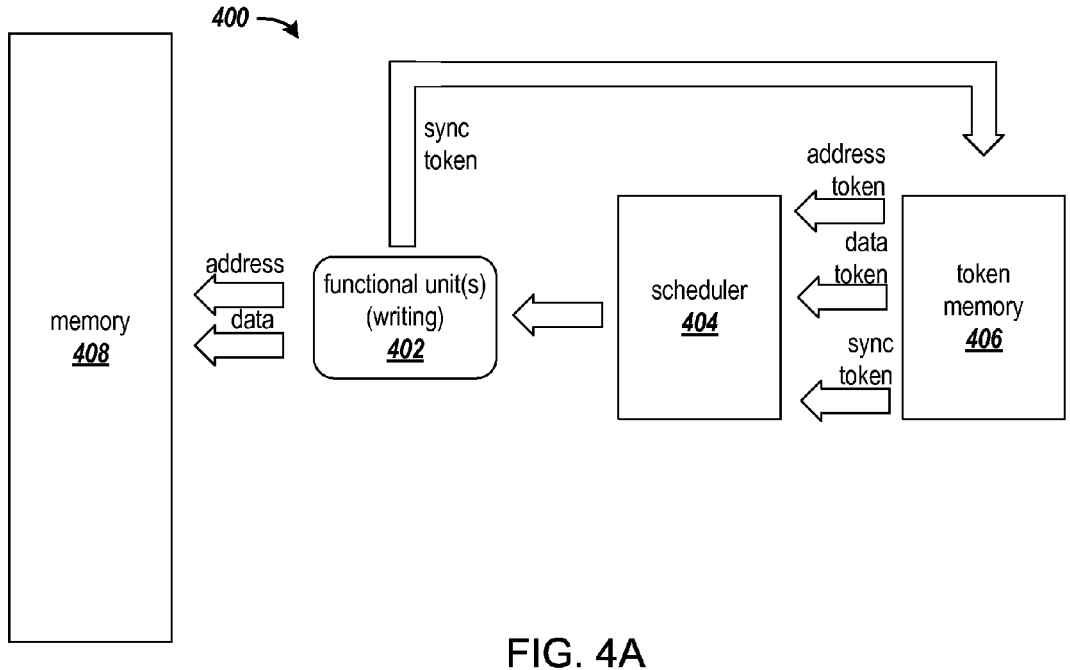
FIGS. 4A and 4B show an example dataflow machine in which the dataflow memory is implemented as a token memory.
Figure 4B:
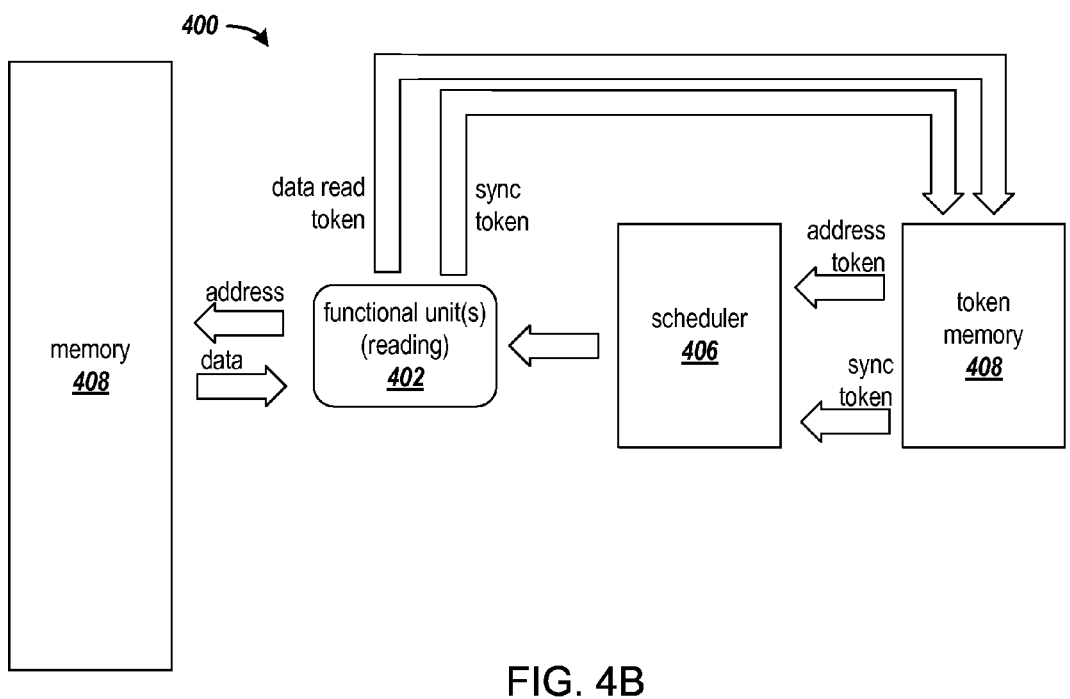

FIGS. 4A and 4B show an example dataflow machine 400 in which the dataflow memory is implemented as a token memory. FIG. 4A shows the data flow where a functional unit performs a write operation to the RAM. FIG. 4B shows the data flow where a functional unit performs a read operation from the RAM.

Dataflow machine 400 includes one or more multiple functional units 402, a scheduler 404, and a token memory 406. The functional units are the components that execute instructions as provided by the scheduler. The scheduler generally monitors the token memory for the availability of data required to execute instructions. When the required data is available for a particular instruction, the scheduler provides the instruction along with the required data in a packet, which is referred to as an instruction token, to one of the functional units for execution. Both the instruction and data for that instruction are stored in the token memory. The output data from a functional unit in executing a compute-type instruction are stored back to the token memory in the form of a data token.

An embodiment of the invention provides RAM 408 as a supplement to the token memory 406. It will be appreciated that components outside the dataflow control of the scheduler may access the RAM 408 for injecting data into the dataflow or receiving data provided by the dataflow.

The access to the RAM for a program operating under control of the dataflow scheduler 404 is provided by the memread and memwrite instructions described above. The memwrite instruction inputs data from the token memory 406 and writes that data to the RAM 408 as shown in FIG. 4A. The memread instruction reads data from the RAM and stores that data in the token memory.

To provide synchronization between the memread and memwrite instructions, each of those instructions stores a synchronization token in the token memory after the operation is complete. This signals to the scheduler that another memread or memwrite to the same address may be selected for execution.

A memwrite instruction does not make an operand available in the token memory for a subsequent instruction, as do ordinary compute-type instructions. Thus, one skilled in the art would not expect a memwrite instruction to store data in the token memory. However, for purposes of synchronizing with a subsequent memwrite or memread instruction, the memwrite instruction stores a synchronization token in the token memory.

Likewise, a memread instruction stores a data token in the token memory based on the data read from the RAM 408. Since the data token contains the information necessary for the scheduler to select another instruction to execute, one skilled in the art would not expect the memread instruction to store any additional data in the token memory. However, for purposes of synchronizing with a subsequent memwrite instruction, the memread instruction stores a synchronization token in the token memory.

In processing a memwrite instruction as shown in FIG. 4A, the scheduler 404 monitors the token memory 404 for availability of an address token, data token, and a synchronization token. Once all three tokens are available, the scheduler provides a memwrite instruction token to the functional unit 402. The instruction token includes the address and data from the tokens read from the token memory. Once a token is passed to an execution unit, it is removed from token memory. The functional unit performs the memwrite instruction by writing the data to the specified address in the RAM 408. In addition, after the data has been written to the RAM the functional unit stores a synchronization token in the token memory. The synchronization token is associated with the just-written address in the RAM 408.

The synchronization tokens will be available in the token memory only when it's safe to access the associated memory address. If it's not yet safe, there will not be a synchronization token present. Read operations can always be performed in parallel but they must happen after any preceding write operations and before any subsequent write operations. Write operations (assuming the same target memory location) must be processed serially. This is why the read operations and write operations pass the synchronization token. A read operation must wait for the synchronization token from any preceding write operations and a write operation must wait for a synchronization token from any preceding read or write operation.

In processing a memread instruction, as shown in FIG. 4B, the scheduler monitors the token memory for availability of an address token and a synchronization token. Once both tokens are available, the scheduler provides a memread instruction token to the functional unit. The instruction token includes the address from the token read from the token memory. The functional unit performs the memread instruction by reading data from the specified address in the RAM 408 and storing that data as a data read token in the token memory 408. In addition, after the data have been read from the RAM the functional unit stores a synchronization token in the token memory. The synchronization token is associated with the just-read address in the RAM 408.

Those skilled in the art will recognize that the dataflow machine 400 may be implemented on any of a variety of hardware architectures known to be suitable for dataflow machines. Such architectures may be readily adapted to include the supplemental RAM 408 with suitable address and data bus connections to the functional units. In addition, the scheduler of those dataflow machines need only be adapted to recognize the required tokens for the additional memread and memwrite instructions for accessing the supplemental RAM.

Figure 5:
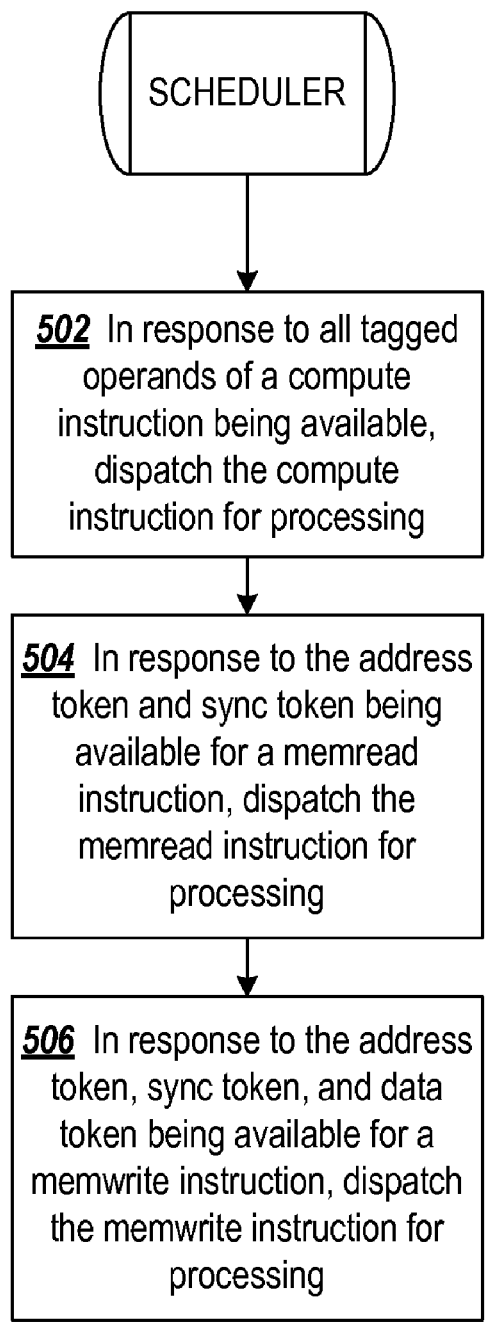
FIG. 5 is a flow chart of an example process performed by a scheduler in dispatching instructions to be performed by a dataflow machine.

FIG. 5 is a flow chart of an example process performed by a scheduler in dispatching instructions to be performed by a dataflow machine. In accordance with an embodiment of the present invention, a scheduler, which normally dispatches compute-type instructions based on the availability of operands, is adapted for further dispatching of memread and memwrite instructions based not only on the availability of the operands (address and data), but also on the availability of synchronization tokens for those instructions.

As shown by step 502, the scheduler, in response to all operands tagged for a compute instruction being available, dispatches the compute instruction for processing. In addition to dispatching compute instructions, the scheduler recognizes the memread and memwrite instructions, along with the synchronization tokens, employed in embodiments of the present invention.

At step 506, in response to the address token and synchronization token being available for a memread instruction, the scheduler dispatches the memread instruction for processing. At step 508, in response to the address token, synchronization token, and data token all being available for a memwrite instruction, the scheduler dispatches the memwrite instruction for processing.

Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for synchronizing memory accesses in a dataflow computing system, comprising:

for each compute operation in the dataflow computing system, waiting for availability in a dataflow memory of only each operand that is required to perform the compute operation, and in response to the availability of only each operand that is required to perform the compute operation, commencing the compute operation;

storing output data from the compute operation in the dataflow memory at completion of the compute operation;

for each write operation for storing data at a respective write address in an external memory of the system, waiting for availability in the dataflow memory of a synchronization token associated with the respective write address, the respective write address, and the data, and in response to the availability of the synchronization token associated with the respective write address, the respective write address, and the data, storing the data to the respective write address in the external memory and storing a synchronization token associated with the write address in the dataflow memory after the writing of the data; and for each read operation for reading data from a respective read address in the external memory, waiting for availability in the dataflow memory of the respective read address and a synchronization token associated with the respective read address, and in response to the availability of the respective read address and the synchronization token associated with the respective read address, reading data from the respective read address of the external memory, storing the data read from the external memory in the dataflow memory, and storing a synchronization token associated with the respective read address in the dataflow memory after reading the data.

2. The method of claim 1, wherein the dataflow memory includes a plurality of first-in-first-out (FIFO) buffers.

3. The method of claim 2, further comprising inputting a synchronization token from a respective FIFO buffer for each read operation.

4. The method of claim 2, further comprising inputting a synchronization token from a respective FIFO buffer for each write operation.

5. The method of claim 2, wherein the storing of the synchronization token associated with the respective read address in the dataflow memory after reading the data includes storing the synchronization token in a respective FIFO buffer.

6. The method of claim 2, wherein the storing the synchronization token associated with the write address in the dataflow memory after the writing of the data includes storing the synchronization token in a respective FIFO buffer.

7. The method of claim 2, further comprising:
inputting a synchronization token from a respective FIFO buffer for each read operation; and
inputting a synchronization token from a respective FIFO buffer for each write operation.

8. The method of claim 2, further comprising:
wherein the storing of the synchronization token associated with the respective read address in the dataflow memory after reading the data includes storing the synchronization token in a respective FIFO buffer; and
wherein the storing the synchronization token associated with the write address in the dataflow memory after the writing of the data includes storing the synchronization token in a respective FIFO buffer.

9. The method of claim 1, wherein the dataflow memory comprises a token memory, and the method further comprises scheduling the compute operation, write operation, and read operation to be performed by one or more functional units.

10. The method of claim 9, further comprising inputting a synchronization token from the token memory for each read operation.

11. The method of claim 9, further comprising inputting a synchronization token from the token memory for each write operation.

12. The method of claim 9, wherein the storing of the synchronization token associated with the respective read address in the dataflow memory after reading the data includes storing the synchronization token in the token memory.

13. The method of claim 9, wherein the storing of the synchronization token associated with the write address in the dataflow memory after the writing of the data includes storing the synchronization token in the token memory.

14. The method of claim 9, further comprising:
inputting a synchronization token from the token memory for each read operation; and
inputting a synchronization token from the token memory for each write operation.

15. The method of claim 9, further comprising:
wherein the storing of the synchronization token associated with the respective read address in the dataflow memory after reading the data includes storing the synchronization token in the token memory; and
wherein the storing of the synchronization token associated with the write address in the dataflow memory after the writing of the data includes storing the synchronization token in the token memory.

16. A computing system having a dataflow architecture, comprising:
a random access memory (RAM);
a plurality of write-type functional units coupled to the RAM;
a plurality of read-type functional units coupled to the RAM;
a plurality of compute-type functional units;
a plurality of respective sets of first-in-first-out buffers coupled between pairs of read-type, write-type, and compute-type functional units;
wherein each write-type functional unit is configured to wait for availability in one of the respective sets of FIFO buffers of a write address, data, and a synchronization token, and in response to the availability of the write address, the data, and the synchronization token, store the data to the write address in the RAM and store a synchronization token in a FIFO buffer of one of the respective sets of FIFO buffers after storing of the data in the RAM;
wherein each read-type functional unit is configured to wait for availability in one of the respective sets of FIFO buffers of a read address and a synchronization token, and in response to the availability of the read address and the synchronization token, read data from the read address and store the data read from the RAM and a synchronization token in one of the respective sets of FIFO buffers after reading the data; and
wherein each compute-type functional unit is configured to wait for availability in one of the respective sets of FIFO buffers of only each operand that is required to perform a compute operation with the operands, and in response to the availability of only each operand that is required to perform the compute operation with the operands, to store processed data in one of the respective sets of FIFO buffers.

17. A dataflow computing system, comprising:
a random access memory (RAM);
a plurality of functional units coupled to the RAM;
a token memory;
a scheduler coupled to the token memory and to the plurality of functional units;
wherein for each write operation for writing data to a respective write address of the RAM, the scheduler is configured to wait for availability in the token memory of the data, the write address, and a synchronization token associated with the respective write address, and in response to the availability of the data, the write address, and the synchronization token associated with the respective write address, activate one of the functional units, and the one functional unit is configured to store the data to the respective write address in the RAM and store a respective synchronization token associated with the respective write address in the token memory after the storing of the data;

wherein for each read operation for reading data from a respective read address of the RAM, the scheduler is configured to wait for availability in the token memory of the respective read address and a synchronization token associated with the respective read address, and in response to the availability of the respective read address and the synchronization token associated with the respective read address, activate one of the functional units, and the one functional unit is configured to read data from the respective read address of the RAM, store the data read from the memory in the token memory, and store a respective synchronization token in the token memory after reading the data; and wherein for each compute operation for processing one or more operands, the scheduler is configured to wait for availability in the token memory of only each of the one or more operands, and the scheduler is configured to activate one of the functional units to process the one or more operands in response to availability of the one or more operands in the token memory, and the one of the functional units is configured to store data to the token memory.

* * * * *